US012176779B2

(12) United States Patent
Schmid et al.

(10) Patent No.: US 12,176,779 B2
(45) Date of Patent: Dec. 24, 2024

(54) ELECTRIC MOTOR WITH BUSBARS (71) Applicant: NIDEC Motors & Actuators (Germany) GmbH, Bietigheim-Bissingen (DE)

(72) Inventors: Jürgen Schmid, Brackenheim (DE); Thomas Kübler, Untergruppenbach (DE); Matthias Fischer, Besigheim (DE)

(73) Assignee: NIDEC MOTORS &ACTUATORS (GERMANY) GMBH, Bietgheim-Bissingen (DE)

( * ) Notice: Subject to any disclaimer, the term of this patent is extended or adjusted under 35 U.S.C. 154(b) by 362 days.

(21) Appl. No.: 17/673,021

(22) Filed: Feb. 16, 2022

(65) Prior Publication Data

US 2022/0263372 A1    Aug. 18, 2022

(30) Foreign Application Priority Data

Feb. 17, 2021    (DE) .................... 102021103787.5

(51) Int. Cl.
*H02K 3/52*    (2006.01)
*H02K 5/22*    (2006.01)

(52) U.S. Cl.
CPC ............ *H02K 3/521* (2013.01); *H02K 5/225* (2013.01); *H02K 2203/09* (2013.01)

(58) Field of Classification Search
CPC  H02K 3/521; H02K 3/52; H02K 3/50; H02K 3/505; H02K 3/28; H02K 2203/09; H02K 2213/03

See application file for complete search history.

(56) References Cited

U.S. PATENT DOCUMENTS

| 2006/0138883 A1* | 6/2006 | Yagai ..................... H02K 3/522 |
| | | 310/179 |
| 2011/0068647 A1 | 3/2011 | Sakaue et al. |
| 2011/0156512 A1 | 6/2011 | Shimomura et al. |
| | | (Continued) |

FOREIGN PATENT DOCUMENTS

| DE | 10 2011 008 386 A1 | 7/2011 |
| WO | WO 2020083559 A1 * | 4/2020 ............ H02K 5/225 |

OTHER PUBLICATIONS

WO 2020083559 A1 translation (Year: 2020).*

(Continued)

*Primary Examiner* — Eric Johnson
(74) *Attorney, Agent, or Firm* — Keating & Bennett, LLP (57) ABSTRACT

An electric motor with stator includes pairs of windings. Winding wire ends of the pairs of windings are electrically contacted at end surfaces with three busbars to define three phases. The three busbars include power source connection terminals which are located adjacent to one another, and the second and third busbars extending over an angular range of approximately 210°, having a same contact scheme with four contact points following one another in the circumferential direction to contact the winding ends and are offset from one another by approximately 120° in the circumferential direction, and the first busbar has a different contact scheme. The first busbar includes a first section and a second section, three contact points located in the first section, a further contact point being located in the second section.

12 Claims, 6 Drawing Sheets

(56) References Cited

U.S. PATENT DOCUMENTS

| | | | |
|---|---|---|---|
| 2011/0175471 A1* | 7/2011 | Marchitto et al. | H02K 3/521 310/71 |
| 2012/0286593 A1* | 11/2012 | Yokogawa et al. | H02K 3/522 310/43 |
| 2020/0251940 A1* | 8/2020 | Seguchi | H02K 3/28 310/263 |
| 2021/0354678 A1* | 11/2021 | Weimar | H02K 3/522 |
| 2022/0140686 A1* | 5/2022 | Hirai et al. | H02K 3/522 310/71 |
| 2023/0098997 A1* | 3/2023 | Fiederling et al. | H02K 1/146 310/71 |

OTHER PUBLICATIONS

Gottkehaskamp, "Optimal gefertigt—Systematischer Entwurf von dreisträngigen Zahnspulenwicklungen bürstenloser Moteren", antriebstechnik, 2007, pp. 30-35.

* cited by examiner

ELECTRIC MOTOR WITH BUSBARS

CROSS REFERENCE TO RELATED APPLICATION

The present application claims priority under 35 U.S.C. § 119 to German Application No. 10 2021 103 787.5, filed on Feb. 17, 2021, the entire contents of which are hereby incorporated herein by reference.

1. Field of the Invention

The present disclosure relates to an electric motor.

2. Background

Brushless DC motors of the type relevant here are referred to as internal rotor motors and have a rotor which is connected to a motor shaft and is rotatably mounted in a housing. The rotor is provided with permanent magnets. A stator is arranged around the motor, which carries a number of windings on an iron core. When suitably controlled, the windings generate a magnetic field that drives the rotor to rotate. The windings are usually wound in three phases and are accordingly provided with three electrical connections through which the windings can be connected to a control unit (ECU). At low power levels, the busbars can be designed as conductive foil busbars. For higher powers, as assumed here, the winding connection wires are contacted via busbars made of copper sheet.

The parallel-connected windings or, if applicable, coil groups are arranged evenly distributed in the stator in the circumferential direction. The electrical connections for the phases, on the other hand, are often not evenly distributed, but are concentrated at one point in the stator. This results in asymmetries in the circuit diagram. The resistances between the phase connections and the coil (groups) are not the same for all phases. This results in different phase resistances and phase currents, which is undesirable.

SUMMARY

Example embodiments of the present disclosure provide electric motors, each of which, despite an asymmetrical arrangement of phase connections, has low asymmetry values in phase resistances of the busbars at low cost.

In an example embodiment of a motor according to the present disclosure, for the purpose of the geometrical description of the electric motor, firstly, an axis of rotation of the motor is assumed to be a central axis and an axis of symmetry. The stator is concentric with the axis of rotation and a rotor. The axis of rotation also defines an axial direction. In addition, with respect to the central axis, a radial direction indicates a distance from the central axis, and a circumferential direction which is distinguished tangentially to a certain radius extending in the radial direction. The connection side of the stator, where the winding wires are connected to the busbar arrangement, is described as the top side of the stator.

Accordingly, an electric motor according to an example embodiment of the present disclosure includes a rotor which is mounted rotatably about an axis of rotation, and a stator which surrounds the rotor externally and includes a stator core with stator teeth which each carry a winding. Each pair of windings adjacent in the circumferential direction are made from one winding wire with winding wire ends, and the winding wire ends are electrically contacted at end surfaces with three busbars to define three phases, the three busbars each including a power source connection terminal to electrically contact the busbar with a power source, and the three power source connection terminals being located adjacent to one another. The second and third busbars extend over an angular range of about 210° and include a same contact scheme with four contact points following each other in the circumferential direction to contact the winding wire ends. The second and third busbars are offset from each other by about 120° in the circumferential direction. The first busbar, on the other hand, has a different contact scheme, the first busbar including a first section and a second section, and three contact points being located in the first section and a further contact point being located in the second section, and the power source connection terminal of the first busbar being located between the two sections, the first busbar extending over an angular range of approximately 300° and the first contact point of the first busbar being arranged offset from the first contact point of the second busbar by approximately 180°.

With the first busbar different from the second and third busbars, the electrical resistances of the busbars can be symmetrical, preventing unwanted asymmetry in the circuit diagram despite the asymmetrical arrangement of the power source connection terminals.

Preferably, the winding pairs defined by adjacent windings all have a same winding scheme.

To adapt the resistances, it can also be provided that the second section of the first busbar has a smaller width in the radial direction than the first section of the first busbar. Preferably, the second and third busbars have the same width as the first busbar in the first section.

Preferably, an electrical resistance of the second section of the first busbar is between about 0.9 mΩ and about 1.3 mΩ.

In an example embodiment, the second section of the first busbar extends about 90° in the circumferential direction.

To save costs, the second and third busbars are preferably identical except for the arrangement of the respective power source connection terminals. The power source connection terminal of the second busbar is preferably located between the first and second contact points and the power source connection terminal of the third busbar is preferably located between the second and third contact points.

It is advantageous if the busbars include base sections from which coil connection terminals to contact the winding ends extend, the busbars lying one above the other and overlapping each other over large (contiguous) angular ranges in plan view in the region of the base sections.

To allow easy contacting, the power source connection terminals of the three phases extend parallel or substantially parallel to each other upward in the longitudinal direction of the stator.

The busbars preferably include coil connection terminals for easy contacting of the winding ends, which have a substantially U-shaped or V-shaped configuration and which extend substantially in a plane perpendicular to the longitudinal axis of the stator, with all openings of the coil connection terminals permitting insertion of the winding wire ends pointing in a common direction.

To ensure that the busbars take up as little installation space as possible, the base section of each busbar preferably lies flat in a plane perpendicular to the longitudinal axis.

The busbars are preferably held in a busbar holder, which is preferably made of an injection molded material, with the busbars being overmolded.

The stator preferably includes six pairs of windings defining coils.

The above and other elements, features, steps, characteristics and advantages of the present disclosure will become more apparent from the following detailed description of the example embodiments with reference to the attached drawings.

BRIEF DESCRIPTION OF THE DRAWINGS

Example embodiments of the present disclosure are explained in more detail below with reference to the drawings. Similar or similarly acting components are designated in the figures with the same reference signs.

DETAILED DESCRIPTION

Figure 1:
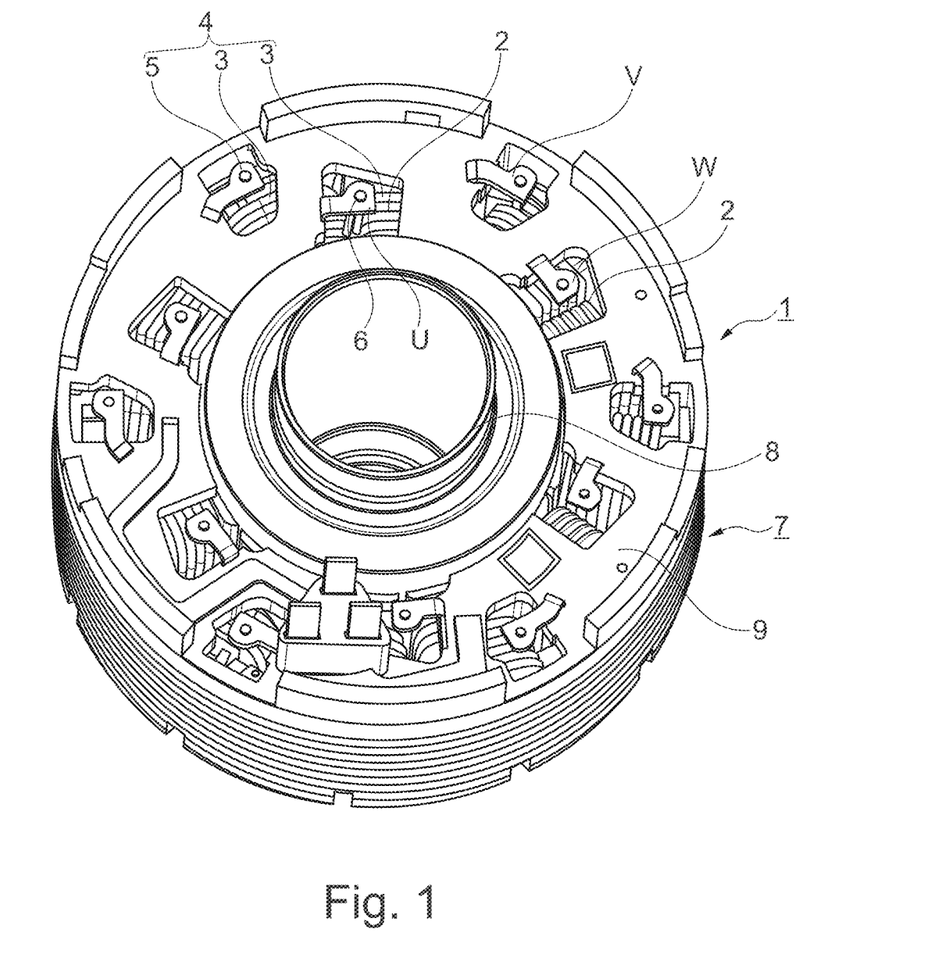
FIG. 1 shows a schematic representation of a stator in plan view according to an example embodiment of the present disclosure.

FIG. 1 shows a stator 1 of an electric motor. The stator 1 of the electric motor consists of an iron core and has winding wires 2 wound around stator teeth. Two windings 3, which are adjacent to each other in the circumferential direction and are formed as pairs of windings, form a coil, which are connected to form three phases U, V, W. A first winding 3 of each winding pair 4 is formed by winding a tooth counterclockwise, in plan view from the inside to the outside. This is followed without interruption by winding clockwise a second tooth of winding pair 4 immediately adjacent to the first tooth. The winding wire end 5 of the first winding lies on the outside in the radial direction and the winding wire end 6 of the second winding of the winding pair 4 lies further on the inside in the radial direction. The winding wire ends 5, 6 are electrically contacted with a busbar assembly 7. All six winding pairs 4 are wound according to the same scheme. The necessary reversal of the magnetic pole within the winding pair 4 is achieved by an inverted electrical connection and a reversal of the direction of the current flow.

The stator 1 has a cylindrical free inner area 8, within which the rotor of the motor, which is not shown, rotates during operation.

The busbar assembly 7 has a busbar holder 9 and three busbars, not shown, arranged in the busbar holder. The busbars are made of an electrically conductive material, preferably metal, in particular copper. The busbar holder consists at least partially or completely of an electrically insulating material, so that short circuits between the busbars can be effectively prevented. The busbar holder is preferably made by injection molding and extends over part of the busbars. In this way, a solid and well-defined physical connection can be provided between the busbar holder and the busbars. The busbar assembly is positioned on an axial side of the stator (top side). The busbars are thus located above the windings 4.

Figure 2:
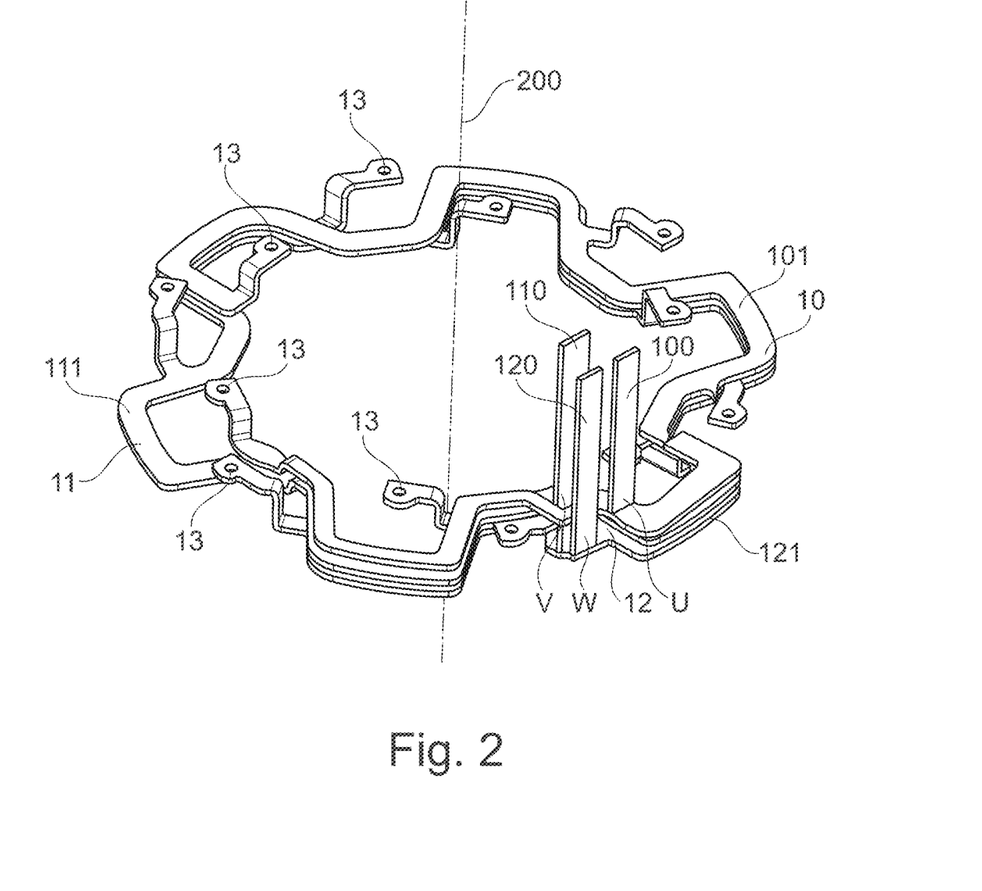
FIG. 2 shows a schematic representation of the busbars of the stator of FIG. 1.

FIG. 2 shows in detail the busbars 10, 11, 12 without busbar holder. Each of the busbars 10, 11, 12 has a power source connection terminal 100, 110, 120 adapted to be electrically connected to a power source, and four coil connection terminals 13 each adapted to be electrically connected to a corresponding winding wire end of the winding pairs of the stator 5, 6. The power source connection terminals 100, 110, 120 of the three phases U, V, W are arranged in close proximity to each other and extend parallel to each other in the longitudinal upward direction. They are designed as flat connectors which are welded to the busbars. However, it is also possible for them to be designed, for example, as cables with a plug assembly.

The coil connection terminals 13 have a substantially U-shaped or V-shaped configuration and extend in a plane perpendicular to the longitudinal axis 200 of the stator. In other words, the coil connection terminals 13 have a U-shaped or V-shaped profile in cross-section with respect to the longitudinal axis 100 and each embrace a winding wire end 5, 6 extending substantially parallel to the longitudinal direction. All openings of the coil connection terminals 13 for insertion of the winding wire ends 5, 6 thereby point in the circumferential direction.

The bus bars 10, 11, 12 extend with a base portion 101, 111, 121 along the circumference but deviate from a circular shape. Starting from the base portion 101, 111, 121, the coil connection terminal members 13 extend both inwardly and outwardly. The base portion of each bus bar 101, 111, 121 lies flat in a plane perpendicular to the longitudinal axis 200, with the base portion 101, 111, 121 being flat or horizontal in the plane 200. The coil connection terminals 13 extend upwardly out of the plane of the base portions 101, 111, 121. The base portions of the individual busbars 101, 111, 121 lie on top of each other and partially overlap.

Figure 3:
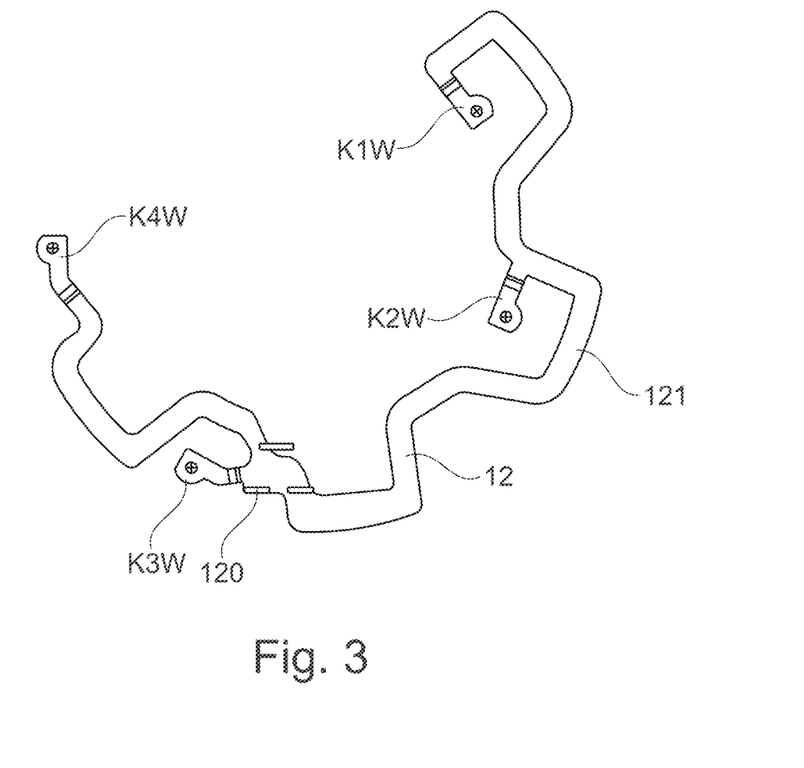
FIG. 3 shows a top view of one busbar of FIG. 2.

FIG. 3 shows the busbar 12 of the third phase W. The busbar 12 extends in the circumferential direction over approximately 210°. A total of four so-called contact points $K1w$, $K2w$, $K3w$, $K4w$ are provided, each formed by a coil connection terminal 13. The first contact point $K1w$ and, in the circumferential direction, the last, fourth contact point $K4w$ are six windings apart. The windings or coils are not shown here. In other words, winding number 1 is contacted at the first contact point $K1w$ and winding number 8 is contacted at the fourth contact point $K4w$. Whereby the windings are numbered continuously in the circumferential direction and two windings each form a winding pair, with winding number 2 forming a winding pair with winding number 3, and so on. Thus, winding number 3 is contacted at the second contact point $K2w$ and winding number 6 is contacted at the third contact point $K3w$. The power source connection terminal 120 is located in the vicinity of the third contact point $K3w$. Since the circumferentially second windings of a pair of windings have the wire end inward, the contact points $K1w$, $K2w$ and $K4w$ are also inward and the respective coil connection terminal 13 protrudes inward from the base portion 121.

Figure 4:
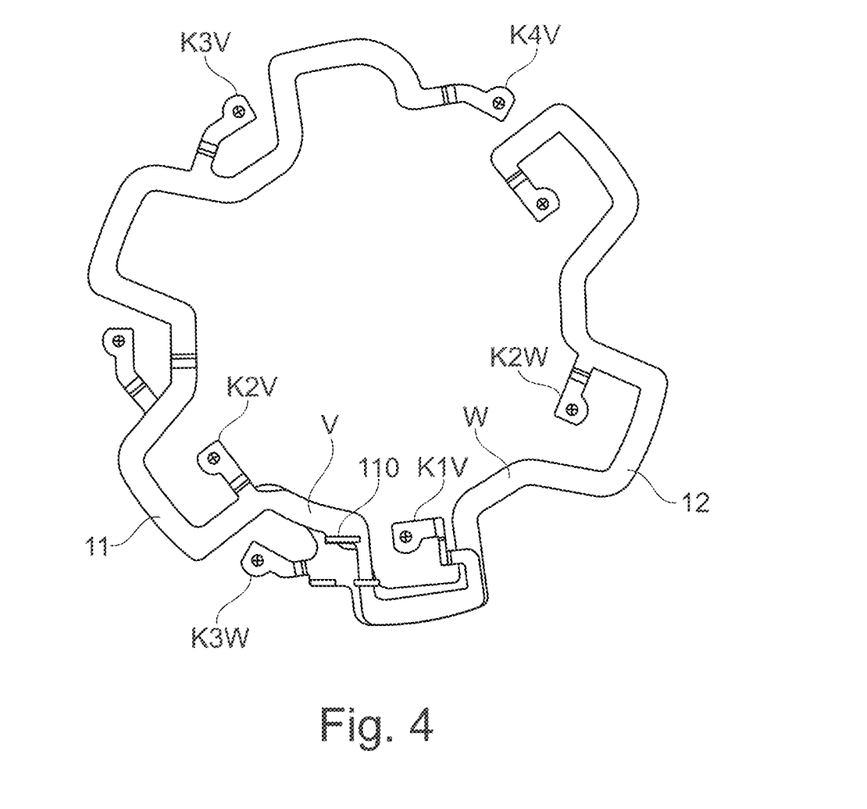
FIG. 4 shows a top view of two busbars of FIG. 2.

FIG. 4 shows the busbars 11, 12 of the third phase W and the second phase V. The first contact point $K1v$ of the second phase V is located between the second and third contact points $K2w$, $K3w$ of the third phase W. The busbar 11 of the second phase V also extends over about 210°, whereby the assignment of the corresponding windings to the contact points is identical to the third phase W except for the offset, i.e. winding number 5 is contacted at the first contact point $K1v$. Winding number 7 at the second contact point $K2v$ and winding number 10 at the third contact point $K3v$ and winding number 12 at the fourth contact point $K4v$. The power source connection terminal of the second phase 110 is located between the first and second contact points of the second phase.

Figure 5:
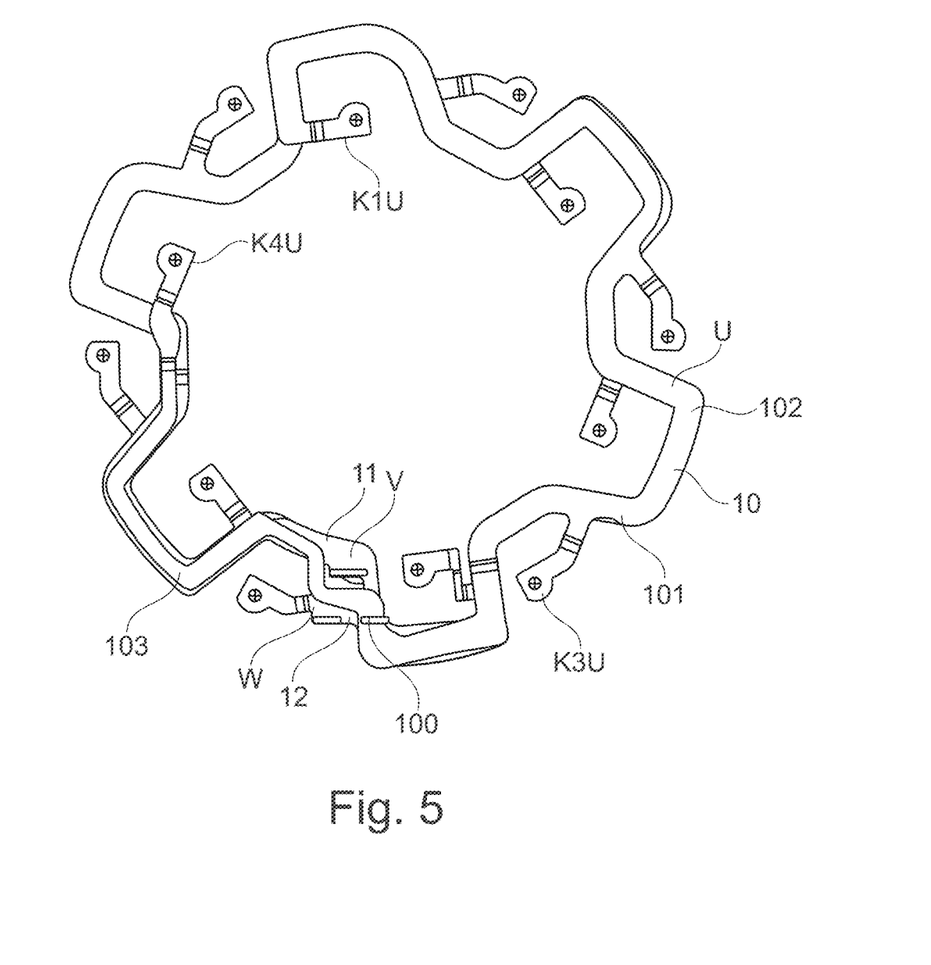
FIG. 5 shows a top view of all three busbars of FIG. 2.

FIG. 5 shows the arrangement of all three busbars 10, 11, 12 in a top view from above. The busbar 10 of the first phase U has a different contact scheme than the other two phases V, W in order to adapt the resistance of the busbar 10 to the resistances of the other two busbars 11, 12.

The base section 101 of the first busbar 10 of the first phase U is divided into two sections 102, 103. A first section 102 which is formed to correspond in width and course to the other two busbars 11, 12, and a second section 103 which has a small width. The first section 102 extends from the first contact point K1$u$ to the power source connection terminal 100, which is located circumferentially behind the third contact point K3$u$. The fourth contact point K4$u$ is connected to the power source connection terminal 100 by the second section 103. If an equal parts approach were taken, the first contact point K1$u$ would be the second contact point K2$u$ and the fourth contact point K4$u$ would be the first contact point K1$u$, and the contact scheme and base portion would be formed analogously to those of the second and third phases V, W. However, since the power source connection terminal 100 would then be located behind the fourth contact point K4$u$ in the circumferential direction, a large asymmetry would occur in the circuit diagram. This asymmetry is reduced with the division into first and second sections 102, 103. The busbar 10 of the first phase U extends over an angular range of about 300°. The first contact point K1$u$ and, in the circumferential direction, the last, fourth contact point K4$u$ are 9 windings apart. The resistance can be further adjusted via the smaller width of the busbar 10 in the second section 103. The second section 103 extends over at least 90°. Although the busbar 10 of the first phase U is longer than that of the other two phases V, W, which requires more material, the division reduces asymmetries in the resistances so that the resistance of the first phase U is within an acceptable resistance range. The other two phases V, W do not need to be changed because of the shorter distances to the respective power source connection terminal 110, 120.

Figure 6:
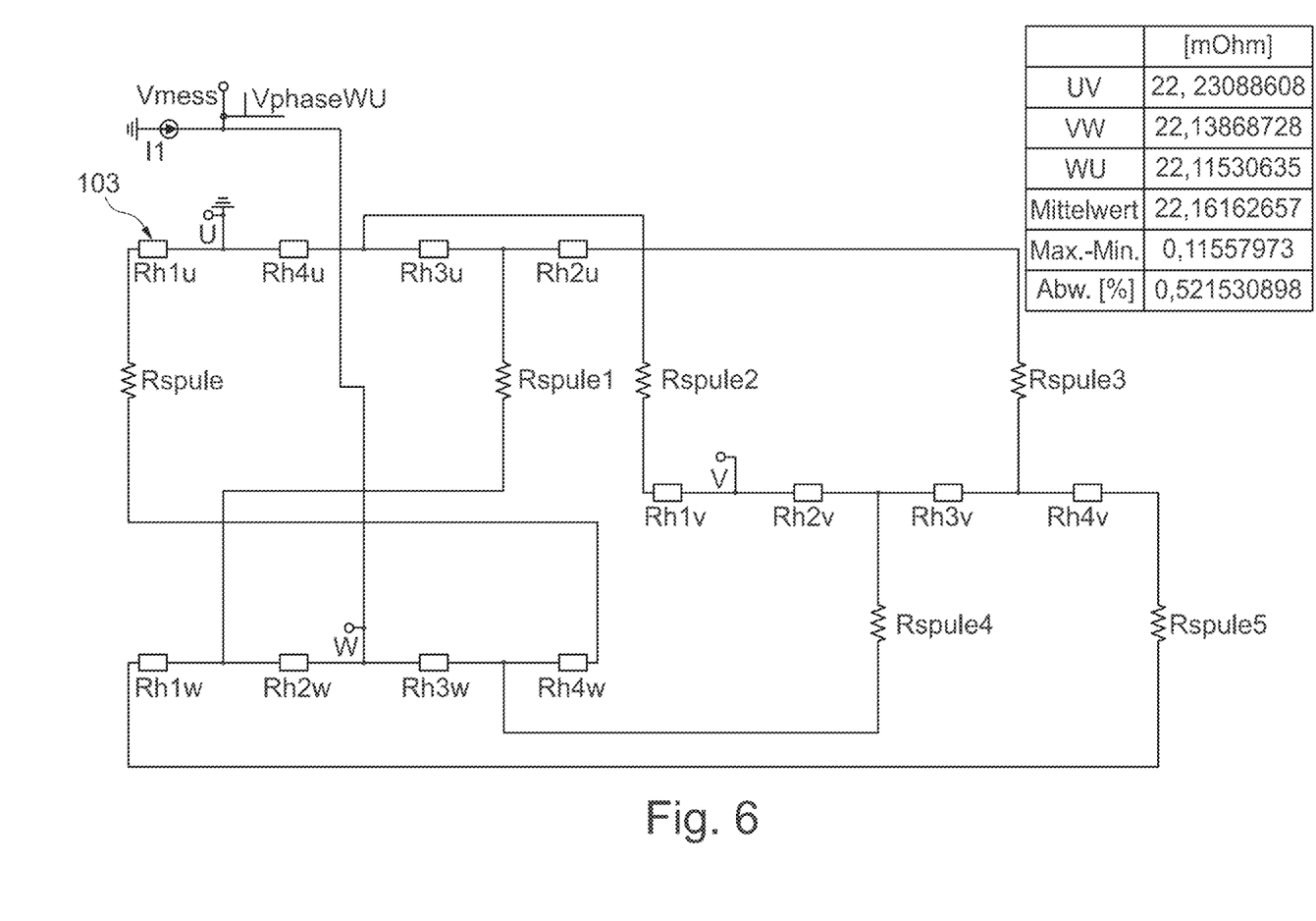
FIG. 6 shows a schematic arrangement of the interconnected busbars according to an example embodiment of the present disclosure in the form of equivalent resistors.

FIG. 6 shows a schematic arrangement of the interconnected winding pairs or coils 4, as well as equivalent resistors for the busbar sections between the contact points. In this example, the busbar of the first phase U has a resistance Rh1$u$ of about 1.3 mΩ for the second section 103, at whose fourth contact point one side of the coil Rspule is contacted. This resistance Rh1$u$ is preferably in a range between 0.9 mΩ and 1.3 mΩ. The other side of the coil Rspule is contacted at the fourth contact point of the busbar 12 of the third phase W. The corresponding equivalent resistor for the busbar section between the fourth and third contact point is designated Rh4$w$. The rest of the interconnection is done as already described in detail above. As can be seen from the overview, due to the selected contact scheme of the busbars, the total resistances of the respective current paths, i.e. coil resistances plus resistances of the busbars plus contact resistances at the contact points, are within a deviation of about 0.5%.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric motor, comprising:
   a rotor which is mounted rotatably about an axis of rotation; and
   a stator which surrounds the rotor externally and includes a stator core with stator teeth which each carry a winding, each pair of the windings which are adjacent in a circumferential direction are defined by one winding wire with winding wire ends electrically contacted with three busbars to define three phases; wherein
   the three busbars each include a power source connection terminal to electrically contact the busbars with a power source, the three power source connection terminals being adjacent to one another;
   a second busbar and a third busbar of the three busbars extend approximately 210° in the circumferential direction, have same contact schemes with four contact points following one another in the circumferential direction to contact the winding ends and are offset from one another by about 120° in the circumferential direction, and the first busbar has a different contact scheme;
   a first busbar of the three busbars includes a first section and a second section, three contact points of the first busbar are located in the first section, a further contact point of the first busbar is located in the second section, and the power source connection terminal of the first busbar is between the two sections; and
   the first busbar extends approximately 300° in the circumferential direction and a first contact point of the four contact points of the first busbar is offset from a first contact point of the three contact points of the second busbar by approximately 180° in the circumferential direction.

2. The electric motor according to claim 1, wherein the pairs of the windings which are adjacent in the circumferential direction all have a same winding scheme.

3. The electric motor according to claim 1, wherein the second section of the first busbar has a smaller width in a radial direction than the first section of the first busbar.

4. The electric motor according to claim 1, wherein an electrical resistance of the second section is between about 0.9 mΩ and about 1.3 mΩ.

5. The electric motor according to claim 1, wherein the second section of the first bus bar extends through about 90° in the circumferential direction.

6. The electric motor according to claim 1, wherein the second and third busbars are identical in shape except for an arrangement of respective power source connection.

7. The electric motor according to claim 1, wherein the busbars include base sections from which coil connection terminals to contact the winding ends extend, the busbars lying one above another and, in plan view, overlapping one another in a region of the base sections over extending angular regions.

8. The electric motor according to claim 7, wherein the coil connection terminals have a substantially U-shaped or V-shaped configuration and extend substantially in a plane perpendicular to a longitudinal axis of the stator, all openings of the coil connection terminals permit insertion of the winding wire ends in a common circumferential direction.

9. The electric motor according to claim 7, wherein the base section of each bus bar is planar in a plane perpendicular to the longitudinal axis.

10. The electric motor according to claim 1, wherein the power source connection terminals of the three phases extend parallel or substantially parallel to each other upward in a longitudinal direction of the stator.

11. The electric motor according to claim 1, wherein the power source connection terminals of the three busbars are directly adjacent to one another in the circumferential direction without any of the contact points provided therebetween.

12. The electric motor according to claim 1, wherein a total circumference of the stator in the circumferential direction is divided into four equal quadrants of 90°; and all of the power source connection terminals of the three busbars are located in a same one of the four equal quadrants of 90°.

* * * * *